United States Patent
Dagnino et al.

(10) Patent No.: US 10,901,406 B2
(45) Date of Patent: Jan. 26, 2021

(54) METHOD OF MONITORING AND CONTROLLING AN INDUSTRIAL PROCESS, AND A PROCESS CONTROL SYSTEM

(71) Applicant: ABB Schweiz AG, Baden (CH)

(72) Inventors: Aldo Dagnino, Cary, NC (US); Veronika Domova, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/326,007

(22) PCT Filed: Aug. 17, 2016

(86) PCT No.: PCT/EP2016/069495
§ 371 (c)(1),
(2) Date: Feb. 15, 2019

(87) PCT Pub. No.: WO2018/033202
PCT Pub. Date: Feb. 22, 2018

(65) Prior Publication Data
US 2019/0346837 A1   Nov. 14, 2019

(51) Int. Cl.
*G05B 23/02* (2006.01)
(52) U.S. Cl.
CPC ..... *G05B 23/0272* (2013.01); *G05B 23/0232* (2013.01)
(58) Field of Classification Search
CPC ............ G05B 23/0272; G05B 23/0232; G05B 23/027
See application file for complete search history.

(56) References Cited

U.S. PATENT DOCUMENTS

| | | | |
|---|---|---|---|
| 2001/0048639 A1* | 12/2001 | Davidson | G04F 1/005 368/82 |
| 2005/0240382 A1 | 10/2005 | Nakaya et al. | |
| 2010/0156654 A1 | 6/2010 | Bullemer et al. | |
| 2010/0289638 A1 | 11/2010 | Borchers et al. | |
| 2012/0020190 A1* | 1/2012 | Suzusho | G04C 21/36 368/10 |
| 2012/0271587 A1 | 10/2012 | Shibuya et al. | |

(Continued)

FOREIGN PATENT DOCUMENTS

EP   3026518 A1   6/2016

OTHER PUBLICATIONS

Folmer, J. et al; "Detection of Temporal Dependencies in Alarm Time Series of Industrial Plants", 4. Evaluation and discussion; 5 conclusion and outlook; Cape Town, South Africa, Aug. 24-29, 2014 pp. 1802-1807.

(Continued)

*Primary Examiner* — Nathan L Laughlin
(74) *Attorney, Agent, or Firm* — Whitmyer IP Group LLC

(57) ABSTRACT

A method of monitoring and controlling an industrial process is provided. The method may be performed in process control system and includes: issuing, in the process control system, a first alarm; determining, in the process control system, at least a first sequence of alarms which the first alarm is part of; and displaying, on a display means, at least a second alarm expected to follow the first alarm at a future point in time, the second alarm being part of the at least first sequence of alarms. A process control system is also provided, and a computer program and a computer program product.

18 Claims, 4 Drawing Sheets

(56) References Cited

U.S. PATENT DOCUMENTS

| | | | |
|---|---|---|---|
| 2013/0099916 A1 | 4/2013 | Camp et al. | |
| 2013/0147630 A1 | 6/2013 | Nakaya et al. | |
| 2014/0198628 A1* | 7/2014 | Yang | H04M 1/72566 |
| | | | 368/262 |
| 2016/0357354 A1* | 12/2016 | Chen | G04G 13/02 |
| 2019/0342447 A1* | 11/2019 | Ko | H04M 1/72569 |

OTHER PUBLICATIONS

International Search Report and Written Opinion of the International Searching Authority Application No. PCT/EP2016/069495 Completed: Apr. 26, 2017; dated May 9, 2017 13 pages.

* cited by examiner

METHOD OF MONITORING AND CONTROLLING AN INDUSTRIAL PROCESS, AND A PROCESS CONTROL SYSTEM

TECHNICAL FIELD

The technology disclosed herein relates generally to the field of monitoring and control of industrial processes.

BACKGROUND

Computer controlled process control systems are used for controlling and/or monitoring industrial processes in many different types of industries and utilities such as automotive, chemical, pharmaceutical, food, metal, mines, steel mills, consumer products, power generation, power distribution, pure and waste water handling, oil refineries, gas pipe-lines and off-shore platforms. Field devices which are instruments or actuators such as motors, valves, valve positioners and sensors of different types perform functions within the process such as driving conveyor belts, opening or closing valves, and measuring process control parameters. Controllers perform control functions to monitor and control the field devices. Such control functions may involve receiving signals indicating process control measurements, processing the received information and generating control signals that are transmitted to the field device(s) to control and/or monitor the operation of the process. An operator is generally able to perform desired operations with respect to the process by means of an operator workstation that is communicatively connected to receive process information from field devices and controllers. The operator may for instance be able to view the current state of the process via a user interface, perform evaluations of the process and modify the operation of the process by using the operator workstation. Controllers and workstations are generally connected via a communications network to a server providing control and monitoring of the process and a database where data, such as historical data relating to control and monitoring of the process is stored.

An industrial process generally requires monitoring of a number of different process parameters, and since industrial processes typically comprise a large number of such process parameters this puts high requirements on a human operator monitoring the processes. When a process deviates from its normal flow, some type of notifications, warnings or alarms are triggered in order to alert the operator that some actions should be taken to handle a problem causing the warnings. Typically, newly appearing alarms are added to a common list of alarms. Each alarm may be given a priority, based on which the operator may prioritize, but in general the operator is handling alarms one by one in the order they appear.

An alarm flood is a situation wherein a higher number of alarms are triggered than the operator can perceive and handle. A reason for the alarm flood may be causally related disturbances, all emanating from a single disturbance. For handling alarm floods the operator has to rely on his experience and knowledge about the processes, and is possibly able to correlate one alarm with another earlier alarm. Furthermore, in reality, there are often also many nuisance alarms including chattering or repeated alarms, or just several sequences of alarms happening in parallel which distracts the operator.

SUMMARY

An objective of the present invention is to address and improve various aspects for monitoring of technical processes in, for instance, an industrial plant. A particular objective is to enable a faster handling of a large number of alarms. Another particular objective is to provide increased efficiency of the monitoring. Still another particular objective is to enable increased safety and ensure reliability of operation. These objectives and others are achieved by the method, system, computer program and computer program products according to the appended independent claims, and by the embodiments according to the dependent claims.

The objective is according to an aspect achieved by a method of monitoring and controlling an industrial process. The method is performed in a process control system and comprises issuing, in the process control system, a first alarm; determining, in the process control system, at least a first sequence of alarms which the first alarm is part of; and displaying, on a display means, at least a second alarm expected to follow the first alarm at a future point in time, the second alarm being part of the at least first sequence of alarms.

The method provides many advantages. For instance, an operator is enabled to handle a large number of alarms faster than what is possible in currently available systems. Another advantage is that the method increases efficiency as well as safety in the industrial plant by providing improved guidance to the operator in acting upon current and/or subsequent alarms. By enabling the operator to quickly plan and act on upcoming alarms, uninterrupted operation of the process being monitored is ensured. The operator is notified of future expected alarms and is thus given a chance to launch preventive measures in an effort to prevent the future expected alarms from being issued. In the method, data on historical alarms can be used in an intelligent manner to guide an operator to avoid future alarms and associated process states.

The objective is according to an aspect achieved by a computer program for a process control system for monitoring and controlling an industrial process. The computer program comprises computer program code, which, when executed on at least one processor on the process control system causes the process control system to perform the method as above.

The objective is according to an aspect achieved by a computer program product comprising a computer program as above and a computer readable means on which the computer program is stored.

The objective is according to an aspect achieved by a process control system for monitoring and controlling an industrial process. The process control system is configured to issue a first alarm; determine at least a first sequence of alarms which the first alarm is part of; and display, on a display means, at least a second alarm expected to follow the first alarm at a future point in time, the second alarm being part of the at least first sequence of alarms.

Further features and advantages of the embodiments of the present invention will become clear upon reading the following description and the accompanying drawings.

DETAILED DESCRIPTION

Figure 1:
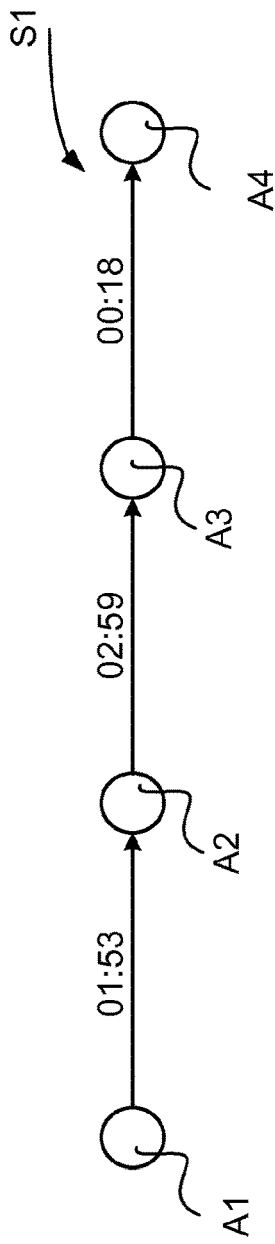
FIG. 1 illustrates an exemplary alarm sequence.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

A typical current approach in industrial process control systems is that alarms are presented to an operator in a common list in the order that the alarms occur. This current approach of notifying the operator about alarms does not take into account that the alarms, in reality, come as sequences. Assuming, for instance, a process wherein a first process parameter (e.g. temperature) is too high or too low. This triggers Alarm 1. Then, after a certain time, an asset (e.g. a boiler) involved in the process is misbehaving because of that parameter and Alarm 2 is triggered. Finally at some point in time the whole process is out of its normal flow and Alarm 3 is triggered. From this example a clear sequence can be seen: Alarm 1 leads to Alarm 2, which leads to Alarm 3.

There are various known data mining algorithms which focus on determining causality between data. Such data mining algorithms may be applied on data relating to historical alarms, such as an alarm log, in order to determine possible sequences of alarms and to calculate the likelihood of these sequences occurring following one or more events. The present invention is not limited to the use of any particular such data mining algorithm. In an aspect, the present invention focuses on and makes use of the results from e.g. a data mining algorithm to improve an operator's ability to control an industrial process as efficiently as possible.

Briefly, a method and process control system are provided for detecting sequences of current alarms "on-the-fly", i.e. in real-time while monitoring technical processes. An intelligent decision support method and a process control system are provided for efficient handling of alarms. According to the invention, instead of dropping appearing alarms in a common alarms list in the order they appear, the operator is enabled to work with the appeared alarm as being a part of a sequence of alarms. Given knowledge about which sequence a current alarm belongs to, where it is in this sequence and/or what the time gap to the next upcoming alarm(s) in the sequence is and possibly also knowing the worst consequence that the current alarm can lead to, enables the operator to work strategically. The operator may also be given knowledge of how much time he can spend on solving a current alarm before a next associated alarm occurs. For example, if an operator can estimate that he will not be able to handle Alarm 1 in the time that is available before Alarm 2 comes (i.e. the time gap between current alarm and next alarm is too short), he can directly start preparing a solution for Alarm 2 even before Alarm 2 has appeared. The operator may, for instance, take action such as contacting a field worker or order a spare part. He is enabled to make well-founded decisions in good time.

FIG. 1 illustrates an exemplary alarms sequence. According to the invention, when an alarm (or warning or other type of alert or notification) comes, a sequence to which it belongs is estimated. The estimated sequence to which the current alarm most likely belongs may be shown on a user interface and the operator may thereby see the sequence. In FIG. 1 one such alarm sequence S1 is shown. The display of the alarm sequence S1 illustrated in FIG. 1 comprises a visual representation of different alarms that are part of the alarm sequence as well as a visual indication of the order of the alarms of the sequence. Each circle depicts a particular alarm A1, A2, A3, A4 and the figure also indicates an average time (which may be estimated in different ways as exemplified later) between two consecutive alarms. For instance, the time between a first alarm A1 and the next, i.e. to a second alarm A2 is estimated to be 1 minute 53 seconds (01:53).

The alarm sequence S1 gives a hint to the operator for figuring out what the next alarm will be and in what time it will appear. Having this information, the operator can take some preventive means or actions in advance. By being given the available time before next-coming alarm comes, e.g. 2 minutes 59 seconds (02:59), he may plan his actions to handle the alarms in an improved way, and he may be better prepared for the outcomes of an alarm.

Considering, for example, the following situation:

1. Operator Peter is in an operator workspace supervising a process
2. A first alarm A1 is displayed on a screen or conveyed to Peter in some other manner.
3. Peter also gets a hint that the first alarm A1 most likely will be followed by an urgent second alarm A2 in 5 minutes if the first alarm A1 is not handled, i.e. if the cause to the first alarm A1 is not remedied.
4. Peter is trying to figure out the reason for the first alarm A1 and a way to handle or remedy it. He suspects that he might not manage to find the solution in the available time, i.e. before the second alarm A2 is estimated to occur.
5. He studies the second alarm A2. In order for it to be fixed, the second alarm A2 requires that a field worker goes to the machine in question (e.g. being the cause to the second alarm A2) and changes some detail with a spare part.
6. Peter, already having this information (5 minutes in advance), notifies a field worker to prepare the spare part and be ready to go to the field.

The invention can be implemented in many ways in view of the user interface, for giving the operator guidance for timely act on alarms, in particular future alarms.

Figure 2:
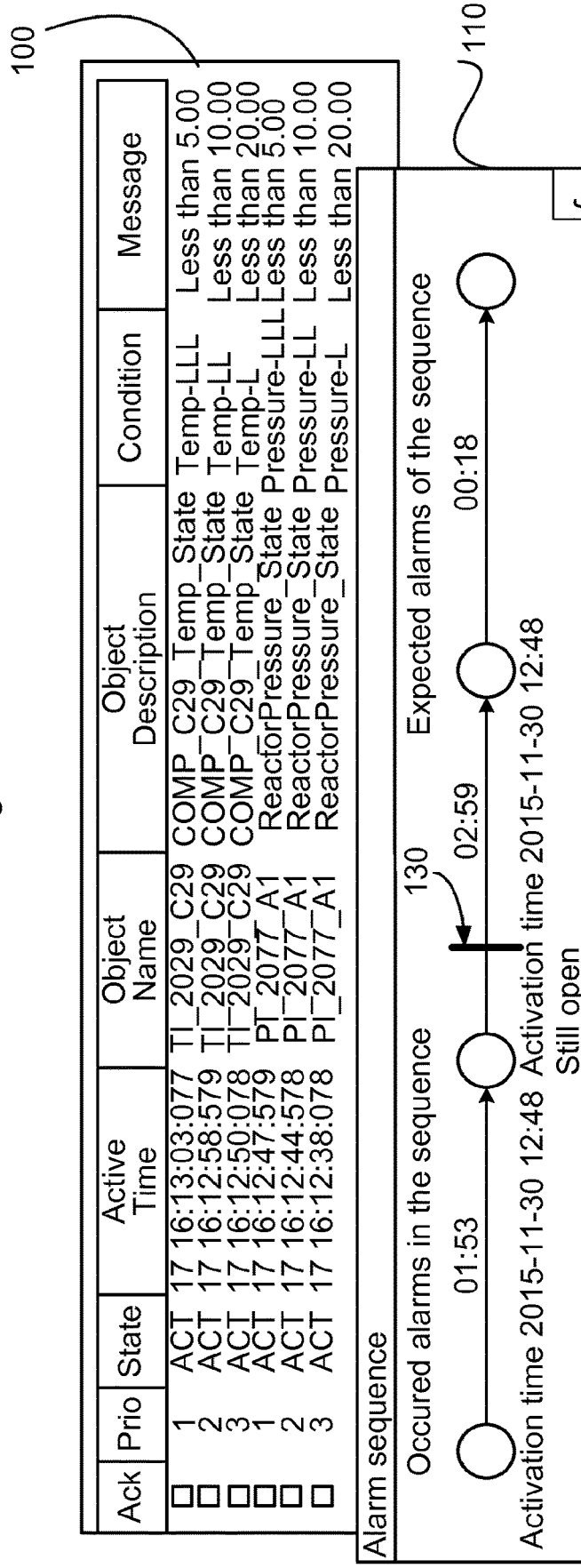
FIG. 2 illustrates an exemplary user interface.

FIG. 2 illustrates an exemplary user interface. A list 100 of alarms is shown, the list 100 being a typical example of an alarms list currently used. The list 100 may, for instance, comprise an activation time ("Active time" in FIG. 2), name of the alarm ("Object name"), description of condition ("Condition") possibly with a column (not shown) with sub-conditions, and a message ("Message") providing some information about the alarm, e.g. that a temperature is less than 5.00 degrees, or below or above a threshold value etc. The list 100 may also comprise a priority for each alarm, e.g. Priority 1, Priority 2, etc. and a status ("State") of the alarm e.g. status "active".

Instead of simply showing the flat list 100 of alarms the operator may, according to an aspect of the invention, get a grouped list where each appearing alarm is also connected to a group of its sequence of alarms. Visually the list 100 can look the same as it does currently, but when the operator marks a particular alarm, e.g. using a mouse click or keyboard input, he may in response see a display of a popup window 110 comprising the alarm sequence S1 (i.e. sequence of alarms, described with reference to FIG. 1) which the current alarm is part of. The operator can see one or more future alarms of the sequence, and, in various embodiments, also which alarms from this alarm sequence S1 have already appeared (previous alarms), their status (whether they are active or not), and if not active when they were fixed, etc. Further, the operator may be shown the current moment in time as a vertical line 130, and all alarms appearing after this are expected future alarms of the sequence S1 (e.g. estimated times). To show the "now moment" (i.e. where in time dimension of this sequence the current moment in time is), e.g. by the vertical line 130, is an illustrative way for the operator to get a sense of the time he has available before the next alarm appears.

As indicated above, the popup window 110 may, in different ways, display various additional information besides the at least one future alarm. In FIG. 2, the popup window 110 is shown comprising an "extend button" 120 for extending the list of alarm sequences. A particular alarm A1 may be part of several different sequences of alarms, e.g. alarm A1 may have different causes leading to different consequences and hence giving different sequences of alarms. Various different display options are contemplated. In some embodiments, only the alarm sequence having the highest probability of being the correct alarm sequence to which the current alarm belongs is shown. In other embodiments, several possible alarm sequences to which the current alarm might belong may be shown directly or on request. For instance, the pop-up window 110 may display all possible alarm sequences to which the current alarm might belong in falling order of probability, or display all possible alarm sequences having a probability above a predetermined threshold of being the correct sequence, i.e. the sequence that actually will take place.

Figure 3:
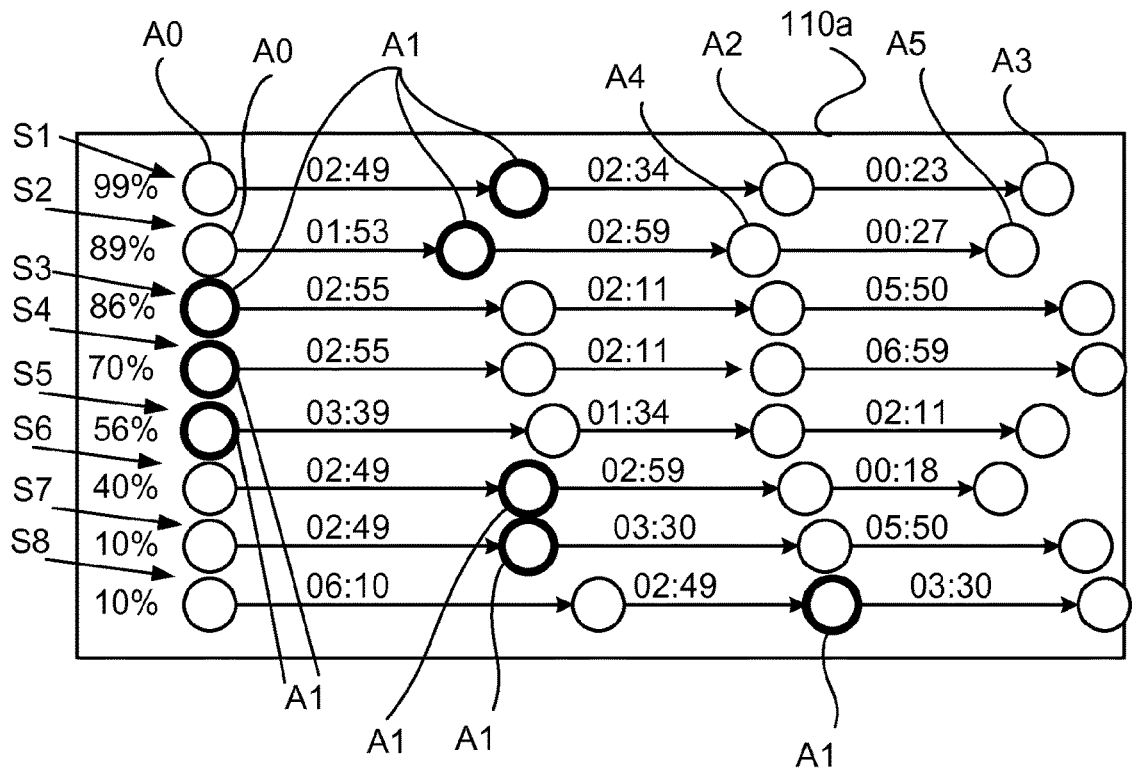
FIG. 3 illustrates an exemplary complete list of alarm sequences.

For instance, by clicking on the extend button 120 (e.g. by using a mouse), the operator may get a list of all potential alarm sequences to which the current alarm might belong (shown in FIG. 3). Each alarm sequence may be provided with a corresponding probability e.g. displayed as a percentage value. The operator may use the indicated probability and rely on his own experience when selecting the alarm sequence, or a subset of alarm sequences, on which to focus when taking action to control the process.

FIG. 3 illustrates an exemplary complete list of alarm sequences appearing when the operator has clicked on the extend button 120. The extended popup window 11a now shows eight alarm sequences S1, S2, S3, S4, S5, S6, S7, S8 with corresponding probability shown in falling order. The same alarm A1, shown in bold circle in all sequences, may, as mentioned, be part of a number of alarm sequences, since the condition that triggered the alarm A1 may be the result of different scenarios. Each alarm sequence S1, S2, S3, S4, S5, S6, S7, S8 may be provided to the operator e.g. on a user interface and shown with a respective probability in percentage of it being the correct sequence. A correct sequence in this context is that the condition (or action) that triggered the current alarm A1, e.g. a temperature sensor indicating a too high value, indeed results in the particular sequence of alarms.

The most probable sequence, in this case alarm sequence S1 having a probability of 99%, may be shown at the top of the list, and then the alarm sequence S2 having the next highest probability is listed below the most probable sequence and so on in a decreasing order of probability. The current alarm A1, i.e. the alarm that the operator has selected to investigate further, may be shown highlighted in some way, e.g. with bold outer border as illustrated in FIG. 3.

Figure 4:
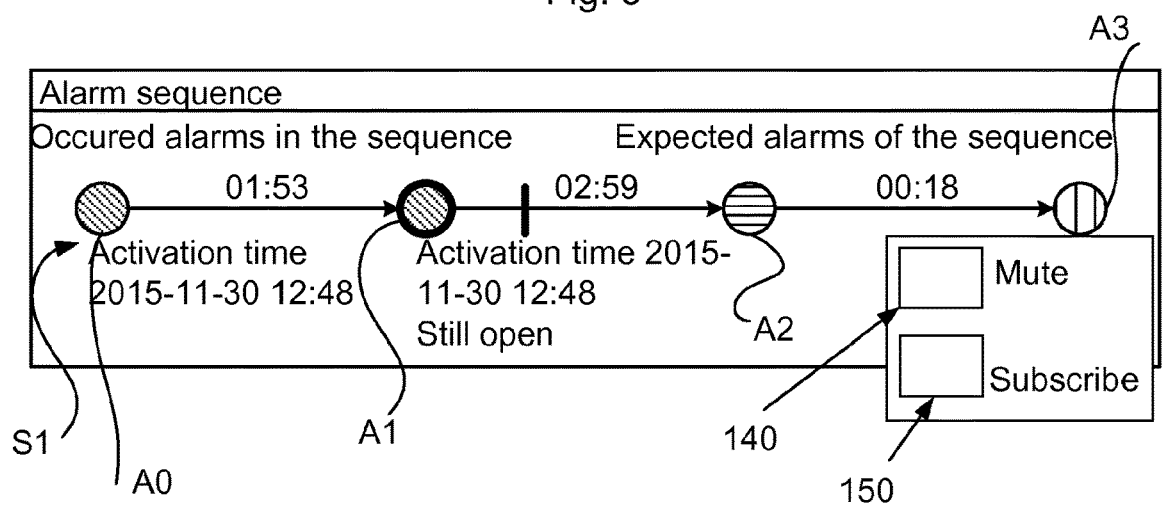
FIG. 4 illustrates features further facilitating monitoring.

FIG. 4 illustrates features further facilitating monitoring, and in particular muting or subscribing to an upcoming alarm. Based on the alarms sequence S1, which may be seen as a sequence of events, the operator can judge which alarms in the sequence will not give him any useful information and he may then switch off the notification when they come. For example, assume that shutting down a pump always will cause a "low flow"-alarm on the pump outlet flow. In this case, if a pump was shut down for some reason, the operator will first get a first alarm A1 notifying that the pump was shut down, whereas the sequence S1 will show that the next alarm, a second alarm A2, will be the notification about a low flow at the pump outlet flow. The operator can indicate, e.g. using a "mute" button 140 on the user interface that no additional information needs to be shown on the user interface. In this case, he may indicate (e.g. by clicking on the mute button 140 using a mouse) that the second alarm A2 does not have to be shown since he is already aware of it. In other embodiments, the operator can subscribe to a future alarm, i.e. indicate that additional notification should be given if and when it appears. The latter case may correspondingly be implemented as a subscribe button 150, and can be especially useful if the appearance of an alarm can serve as a sign of something significant (e.g. critical) is to happen.

FIG. 4 also illustrates a feature for indicating priority of an alarm. In particular, each alarm A0, A1, A3, A4 may be shown with e.g. different colors depending on priority level or level of severity. For instance, an alarm of low severity (A0, A1) may be shown with a first color or first pattern, an alarm of medium severity (A2) may be shown with a second color or second pattern and an alarm of high severity (A3) may be shown with a third color or third pattern.

Figure 5:
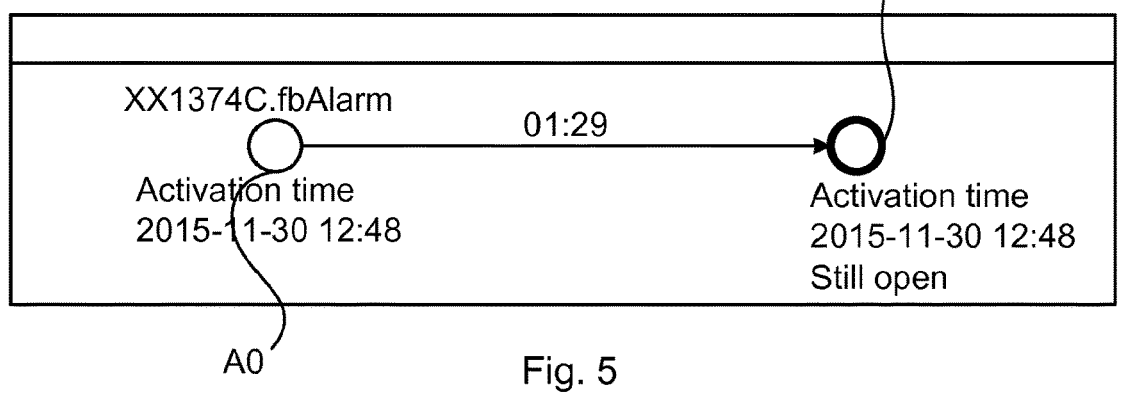
FIG. 5 illustrates an example of critical event analysis application.

FIG. 5 illustrates an example of critical event analysis application. Instead of an entire alarms sequence S1, a simplified visualization can be provided. Critical analysis allows the operator to see which event lead to the current critical alarm or which event will follow the current critical alarm. In FIG. 5, the former case is shown as example, i.e. a current alarm A1 (bold outer border) and a previous alarm A0, in this particular exemplary case alarm "XX1374C.fbAlarm" being the event that led to the current alarm.

In addition, the method can, according to an aspect of the invention, give the operator recommendations regarding the best way of spending the available time between the alarms, e.g. if there is a chance that current alarm can be fixed on time, the operator should concentrate on it, otherwise the operator should keep in mind the next alarm expected to appear. Such recommendation may be shown on the user interface and/or be given audibly.

Figure 6:
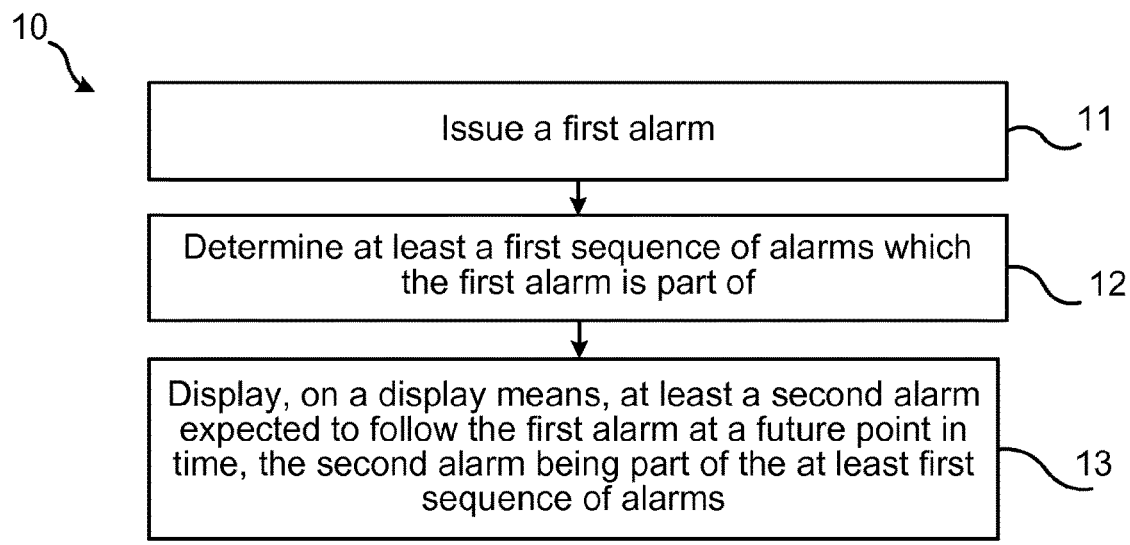
FIG. 6 illustrates a flow chart over steps of an embodiment according to the invention.

FIG. 6 illustrates a flow chart over steps of an embodiment according to the invention.

A method 10 of monitoring and controlling an industrial process is provided. The industrial process that is being monitored and controlled, e.g. in an industrial plant, may be an automated process, wherein e.g. machinery, boilers or other equipment is operated with no or with reduced human intervention. Such process needs to be monitored by a human operator for ensuring safety and proper functioning. The industrial process being monitored and controlled typically involves a number of (at least one) physical objects, which may also (but need not) be controlled by the operator. The method 10 is performed in a process control system 50, e.g. in a control device 30 thereof.

The method 10 comprises issuing 11, in the process control system 50, a first alarm A1. The first alarm A1, and any alarms, may be issued in response to a detected state in the industrial process in e.g. a control server being communicatively connected to controllers and field devices of the process control system 50. A field device may report a fault condition or send any type of parameter values over a communication network to the control server, which may establish, based on the received parameter values that a fault condition prevails and hence issue the alarm. The first alarm A1 may thus be triggered e.g. by a sensor indicating a fault condition, upon which the first alarm signal is issued.

The method 10 comprises determining 12 at least a first sequence S1 of alarms which the first alarm A1 is part of. This determining 12 may, as has been described, be based on available data mining algorithms. Upon receiving the first alarm A1, a search may be triggered in e.g. a database 31 for retrieving a sequence of alarms which the first alarm A1 forms part of. The process control system 50, e.g. a control device 30 thereof, may, upon receiving the first alarm A1, send a request to the database 31 requesting at least one sequence of alarms including the first alarm A1, and receive in response at least one such sequence. The determining 12 then comprises the sending of the request and receiving in response the at least first sequence S1 of alarms.

The first alarm A1 may be seen as being grouped with (part of) one or more predetermined sequences of alarms. An operator thereby obtains knowledge on at least one possible expected second alarm A2.

The method 10 comprises displaying 13, on a display means 25 such as a display of an operator workstation, at least a second alarm A2 expected to follow the first alarm A1 at a future point in time, the second alarm A2 being part of the at least first sequence S1 of alarms.

Several advantages are brought by means of the method 100 as has been described earlier. By making the operator aware of an upcoming second alarm (at least potentially upcoming) valuable time is saved when it comes to resolving any problems causing the alarm(s).

In an embodiment, the method 100 comprises displaying, on the display means 25, at least one of an estimated point in time for the occurrence of the at least second alarm A2, and an estimated time available until the second alarm A2 is triggered. Showing one or both of the estimated point in time of the second alarm A2 and estimated available time before it is issued gives the operator a valuable visual decision support enabling him to efficiently handle alarms.

The estimated time available until the next alarm in the alarm sequence may, for instance, be displayed as minutes and seconds: 01:29. This estimated time may be updated in real time, i.e. reduced by one second at a time and displayed. This is a very efficient and highly concrete way to alert the operator on how much time there is available to act before the next alarm in the sequence appears. The operator may have time enough to fix a problem causing the first alarm, even within the available time before the second alarm, and the second alarm will thus not be triggered at all.

In other embodiments, the method 10 comprises displaying, on the display means 25, an estimated point in time for the occurrence of each subsequent alarms of the first sequence S1 of alarms. In still other embodiments, any alarms preceding the first alarm A1 are also shown.

In some embodiments, the method 100 comprises issuing 11 the first alarm A1 and also issuing a second alarm A2 before the determination of the at least first sequence S1 of alarms is made. That is, the determining 12 of the at least first sequence S1 of alarm is based on the issued first alarm A1 and the issued second alarm A2. Having two alarms A1, A2 typically reduces the number of potential alarms sequences which the alarms may be part of, and may also render the determining 12 faster. In other instances, the determining 12 is made based only on the first alarms A1, and when a second alarm A2 is issued, the number of potential alarm sequences will, again, typically be reduced since the particular order and/or time between the alarms may exclude a number of the potential alarms sequences.

The time available until a next alarm may be estimated in different ways. The estimation may, for instance, be based on knowledge on alarms sequences in the particular process at hand. It may be known that a first alarm of a first alarms sequence is always followed by a second alarm within 5 minutes. As another example, it may be known that the first alarm when belonging to a second sequence is always followed by a second alarm within 3 minutes. The estimations may also be based on an average of several first alarms sequences having happened: e.g. the average of the time periods elapsed between two particular alarms (e.g. alarms A1 and A2) of the different occurrences of the first alarms sequence.

Based on the information, e.g. current time, estimated time of next alarm or estimated time available until next alarm that is provided to the operator through the user interface, the operator is enabled to make well-founded decisions on how to handle the different alarms, e.g. how to best resolve the fault causing the alarm.

In some embodiments, the method 10 comprises displaying, on the display means 25, a plurality of sequences S1, S2, S3, . . . , S8 of alarms which the first alarm A1 is part of.

Figure 7:
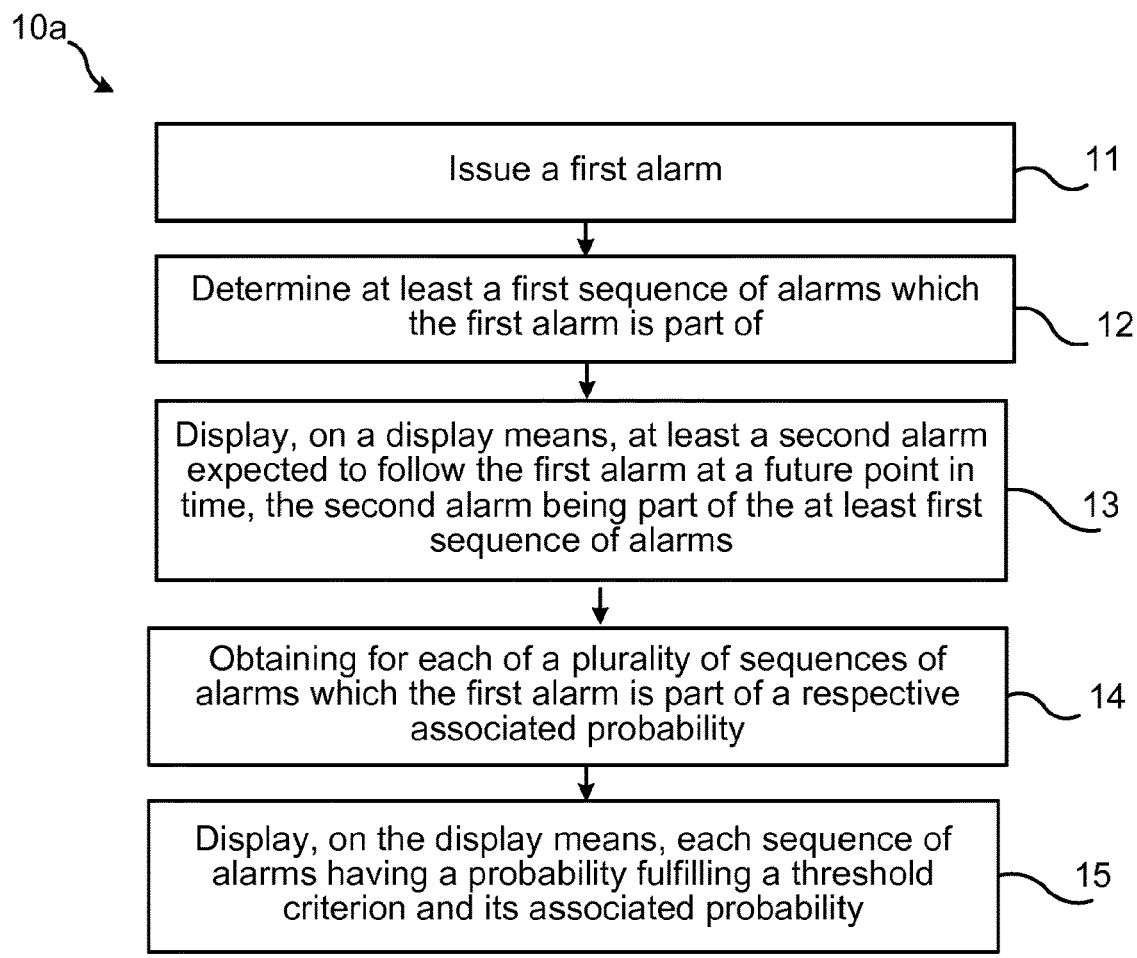
FIG. 7 illustrates a flow chart over steps of an embodiment according to the invention.

FIG. 7 illustrates a flow chart over steps of an embodiment according to the invention. In this embodiment, the method 10a comprises:

issuing 11, in the process control system 50, a first alarm A1,
  determining 12, in the process control system 50, at least a first sequence S1 of alarms to which the first alarm A1 belongs,
  displaying 13, on a display means 25, at least a second alarm A2 expected to follow the first alarm A1 at a future point in time, the second alarm A2 being part of the at least first sequence S1 of alarms,
  obtaining 14 for each of a plurality of sequences S1, S2, S3, . . . , S8 of alarms which the first alarm A1 is part of, a respective associated probability, and
  displaying 15, on the display means 25, each sequence S1, S2, S3, . . . , S8 of alarms having a probability fulfilling a threshold criterion and associated probability. For instance, all sequences having a probability higher than a certain threshold value (e.g. a predetermined threshold value) may be shown with their respective probability value. Another threshold criterion may be the probability being equal to or higher than a threshold value.

It is noted that in the above embodiment, and in other embodiments, the steps may be performed in another order than illustrated and that steps may be merged into one. For instance, the displaying 13 at least a second alarm A2 and the displaying 15 each sequence may be performed as a single step.

Figure 8:
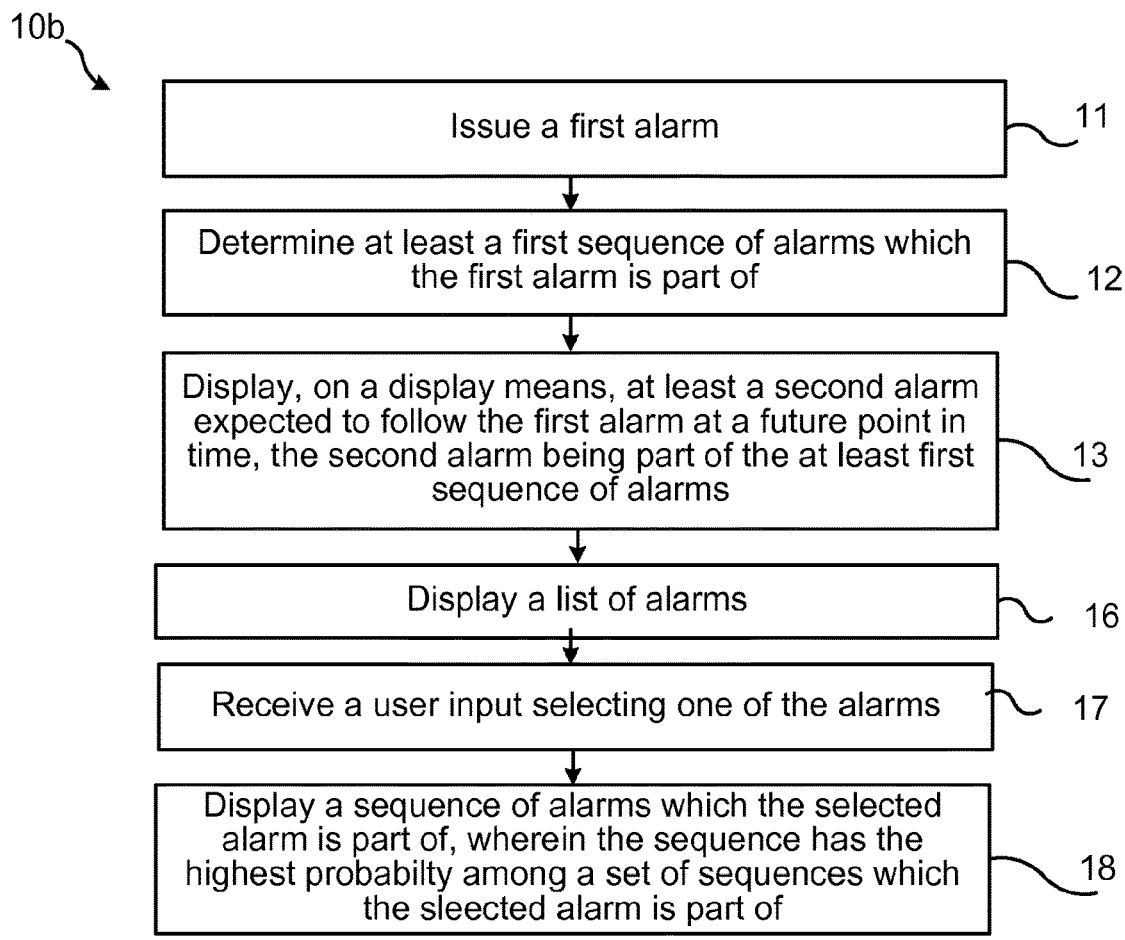
FIG. 8 illustrates a flow chart over steps of an embodiment according to the invention.

FIG. 8 illustrates a flow chart over steps of an embodiment according to the invention. In this embodiment, the method 10b comprises:

issuing 11, in the process control system 50, a first alarm A1, determining 12, in the process control system 50, at least a first sequence S1 of alarms to which the first alarm A1 belongs, displaying 13, on a display means 25, at least a second alarm A2 expected to follow the first alarm A1 at a future point in time, the second alarm A2 being part of the at least first sequence S1 of alarms, displaying 16 a list of alarms, receiving 17, in the process control system 50, a user input selecting one of the alarms, and displaying 18, in response to the user input, a sequence S1 of alarms which the selected alarm is part of, wherein the sequence S1 has the highest probability among a set of sequences which the selected alarm is part of.

In a variation of the above embodiment, the method 10b comprises displaying at least a second sequence S2 in the set of sequences which the selected alarm is part of, and its associated probability.

In some embodiments, the determining 12 comprises analyzing data of a history log of past alarms using a data mining algorithm for determining the at least one sequence S1 of alarms.

In some embodiments, the method 10 comprises:

receiving, in the process control system 50, a user input defining a control action for preventing the second alarm A2 from being issued, and effectuating, in response to the user input, the control action.

By means of the user being notified through the displaying step 13 that the second alarm A2 is likely to be issued at a future point in time the user is given a chance to perform a control action in response to this notification in order to try to prevent the second alarm A2 from actually occurring after the first alarm A1. Depending on what the second alarm A2 concerns different control actions may be performed to prevent the second alarm A2. The control action may e.g. be a command to an actuator e.g. to open or close a valve, a request to change a control parameter, a command to shut down a field device or a section of the process, an order for a replacement part or a maintenance request for a controller or field device of the process, an update of process control system software etc.

In a variation of the above embodiment, the user input is received within an estimated time period available after receiving the first alarm A1 and before the second alarm A2 is issued.

In some embodiments, the method 10 comprises receiving a user input requesting a popup window 110 comprising detailed information on the first alarm A1, and providing, in response, the popup window 110. This embodiment provides several advantages. For instance, the operator may easily access more information which may be needed in the process of deciding course of action for handling the cause of the alarm. The information may be provided for display on the display means 25 in the form of a popup window, which may then be easily closed when not needed anymore. The user input may, for instance, comprise the user using an input device, e.g. a mouse or keyboard, for clicking on a button 120 for requesting the additional information. This embodiment has also been described with reference to FIG. 2.

In some embodiments, the method 10 comprises receiving a user input indicating desire to subscribe to notifications relating to a specified alarm. The method 10 may then comprise the step of displaying, in response to receiving the user input, the notifications when they occur. This embodiment has also been described in more detail with reference to FIG. 4.

In some embodiments, the method 10 comprises receiving a user input indicating desire to skip notifications relating to a specified alarm. This embodiment has also been described in more detail with reference to FIG. 4.

In some embodiments, the method 10 comprises obtaining for the at least first sequence S1 of alarms a probability of the first alarm A1 being triggered by a condition resulting in the first sequence S1 of alarms and displaying, on the display means 25, the obtained probability. This embodiment has also been described in more detail with reference to FIG. 3.

In some embodiments, the method 10 comprises visually indicating a priority level associated with the first and second alarms on the display means 25. The priority level may, as has been described e.g. in relation to FIG. 4, be shown in different colors or different patterns.

In some embodiments, the method 10 comprises displaying, on the display means 25, a suggested action relating to the first alarm A1.

Figure 9:
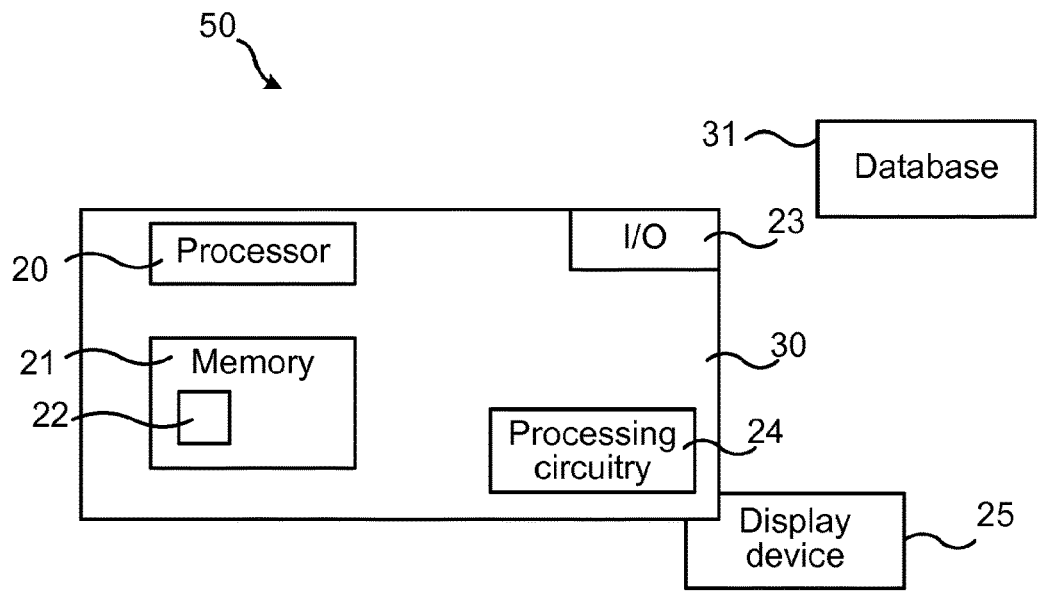
FIG. 9 illustrates schematically a process control system and means for implementing embodiments of the method in accordance with the present invention.

FIG. 9 illustrates schematically a process monitoring and control system and means for implementing embodiments of the method in accordance with the present invention.

The process monitoring and control system 50 is provided for monitoring and controlling a process, e.g. an automated process as described earlier. The process monitoring and control system 50 may comprise controllers and workstations connected via a communications network to a server providing control and monitoring of the process and a database where data, such as historical data relating to control and monitoring of the process is stored. The process control system 50 may comprise a control device 30, being e.g. the server providing control and monitoring, for implementing the described method 10. In other embodiments the method 10 is performed in a distributed manner, involving several devices, e.g. the control device 30, a database 31 and display means 25.

The control device 30 may, for instance, be a server, a virtual server or a virtual machine. The control device 30 may comprise a processor 20 comprising any combination of one or more of a central processing unit (CPU), multi-processor, microcontroller, digital signal processor (DSP), application specific integrated circuit etc. capable of executing software instructions stored in a memory 21 which can thus be a computer program product. The processor 20 can be configured to execute any of the various embodiments of the method 10 for instance as described in relation to any of FIGS. 6, 7 and 8.

The memory 21 of the control device 30 can be any combination of read and write memory (RAM) and read only memory (ROM), Flash memory, magnetic tape, Compact Disc (CD)-ROM, digital versatile disc (DVD), Blu-ray disc etc. The memory 21 may also comprise persistent storage, which, for example, can be any single one or combination of magnetic memory, optical memory, solid state memory or even remotely mounted memory.

The control device 30 may comprise an interface 23 for communication with other devices and/or entities of the process control system 50. The interface 23 may also be used for communicating with devices and/or entities external to the process control system 50, e.g. for communication with devices of the process being monitored, e.g. sensors sensing parameters (such as pressure, temperature etc.) of the process. The interface 23 may, for instance, comprise a protocol stack, and/or hardware for communication with other devices or entities. The interface 23 may be used for receiving data input and for outputting data.

The control device 30 may comprise additional processing circuitry 24 for implementing the various embodiments according to the present invention.

The process control system 50 may comprise a display means 25, also denoted display device 25. In some embodiments, the control device 30 may comprise or be connectable, in a wired or wireless manner, to the display device 25. The display device 25 may be any type of output device for presentation of information: Liquid crystal display (LCD), flat panel display, electronic visual display, etc.

The process control system 50 may comprise a database 31 comprising information on alarms sequences, the database 31 comprising the information stored e.g. in a memory device and accessed by a database management system. In some embodiments, the control device 30 may comprise or be able to communicate with the database 31. As mentioned earlier, a sequence to which an alarm belongs is estimated. This may be implemented in different ways, the alarms sequences may, for instance, be estimated based on data mining algorithms. The data mining algorithms may recognize patterns in the alarms sequences. An alarm sequence mining algorithm may be run against a data log comprising alarms for the particular use case, e.g. energy or power generating plants an oil refinery or chemical plant. This will generate the database 31 with sequences that can be observed in the particular use case. When an alarm comes, the control device 30 may be configured to check the alarm against all possible alarms sequences in the database 31. Previous alarms may also be taken into account in order to calculate the most probable alarms sequence. The control device 30 may then be configured to return one or more of these most probable alarms sequences to the operator and configured to display the alarms sequence(s) on the user interface in the various different ways that has been described e.g. with reference to FIGS. 1-5. The estimated times available between two consecutive alarms may be based on information available in the database 31.

The present invention also encompasses a computer program 22 for a process control system 50 for monitoring a process. The computer program 22 comprises computer program code, which, when executed on at least one processor in the process control system 50, causes the process control system 50 to perform the method 10 according to any of the described embodiments.

The present invention also encompasses computer program products 21 for a process control system 50 for monitoring a process. The computer program product 21 comprises the computer program 22 for implementing the embodiments of the methods as described, and a computer readable means on which the computer program 22 is stored. The computer program product, or the memory, thus comprises instructions executable by the processor 20. Such instructions may be comprised in a computer program, or in one or more software modules or function modules. The computer program product 21 may, as mentioned earlier, be any combination of random access memory (RAM) or read only memory (ROM), Flash memory, magnetic tape, Compact Disc (CD)-ROM, digital versatile disc (DVD), Blu-ray disc etc.

The process control system 50 may comprise function modules/software modules for implementing embodiments of the present invention. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 10 that has been described in various embodiments.

A process control system 50 is provided for monitoring an industrial process. The process control system 50 is configured to:
issue a first alarm A1,
determine at least a first sequence S1 of alarms which the first alarm A1 is part of, and
display, on a display means 25, at least a second alarm A2 expected to follow the first alarm A1 at a future point in time, the second alarm A2 being part of the at least first sequence S1 of alarms.

The process control system 50 may be configured to perform the above steps e.g. by comprising one or more processors 20 and memory 21, the memory 21 containing instructions executable by the processor 20, whereby the process control system 50 is operative to perform the steps. In some embodiments, all steps are performed in a single device, e.g. in the control device 30.

In an embodiment, the process control system 50 is configured to display, on the display means 25 at least one of an estimated point in time for the occurrence of the at least second alarm A2 and an estimated time available until the second alarm A2 is triggered.

In an embodiment, the process control system 50 is configured to display, on the display means 25, a plurality of sequences S1, S2, S3, . . . , S8 of alarms which the first alarm A1 is part of.

In an embodiment, the process control system 50 is configured to:
obtain for each of a plurality of sequences S1, S2, S3, . . . , S8 of alarms which the first alarm A1 is part of, a respective associated probability, and
output, on the display means 25, each sequence S1, S2, S3, . . . , S8 of alarms having a probability fulfilling a threshold criterion and associated probability.

In an embodiment, the process control system 50 is configured to:
display a list of alarms,
receive, in the process control system 50, a user input selecting one of the alarms, and
display, in response to the user input, a sequence S1 of alarms which the selected alarm is part of, wherein the sequence S1 has the highest probability among a set of sequences which the selected alarm is part of.

In an embodiment, the process control system 50 is configured to display at least a second sequence S2 in the set of sequences which the selected alarm is part of, and its associated probability.

In an embodiment, the process control system 50 is configured to determine the at least first sequence S1 of alarms which the first alarm A1 is part of by analyzing data of a history log of past alarms using a data mining algorithm for determining the at least one sequence S1 of alarms.

In an embodiment, the process control system 50 is configured to:
receive, in the process control system 50, a user input defining a control action for preventing the second alarm A2 from being issued, and effectuating, in response to the user input, the control action.

In an embodiment, the process control system 50 is configured to receive a user input requesting a popup window 110 comprising detailed information on the first alarm A1, and to provide, in response, the popup window 110.

In an embodiment, the process control system 50 is configured to receive a user input indicating desire to subscribe to notifications relating to a specified alarm.

In an embodiment, the process control system 50 is configured to receive a user input indicating desire to skip notifications relating to a specified alarm.

In an embodiment, the process control system 50 is configured to obtain for the at least first sequence S1 of alarms a probability of the first alarm A1 being triggered by a condition resulting in the first sequence S1 of alarms and to output, on the display means 25, the obtained probability.

In an embodiment, the process control system 50 is configured to visually indicate a priority level associated with the first and second alarms on the display means 25.

In an embodiment, the process control system 50 is configured to output, on the display means 25, a suggested action relating to the first alarm A1. Such suggested action may be based on stored historical information on the time required for performing different control actions or time required for control action to take effect and time left until one or more future expected alarms are expected to occur.

In an embodiment, the process control system 50 comprises a single control device 30. That is, the control device 30 is configured to perform the steps described above.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method of monitoring and controlling an industrial process, the method being performed in a process control system and comprising:
   issuing, in the process control system, a first alarm,
   determining, in the process control system, at least a first sequence of alarms which the first alarm is part of,
   displaying, on a display means, at least a second alarm expected to follow the first alarm at a future point in time, the second alarm being part of the at least first sequence of alarms,
   displaying, on the display means, at least one of an estimated point in time for the occurrence of the at least second alarm, and an estimated time available until the second alarm is triggered,
   obtaining for each of a plurality of sequences of alarms which the first alarm is part of, a respective associated probability, and
   displaying, on the display means, each sequence of alarms having a probability fulfilling a threshold criterion and its associated probability.

2. The method as claimed in claim 1, comprising displaying, on the display means, a plurality of sequences of alarms which the first alarm is part of.

3. The method as claimed in claim 1, comprising:
   receiving, in the process control system, a user input selecting one of the alarms, and
   displaying, in response to the user input, a sequence of alarms which a selected alarm is part of, wherein the sequence has the highest probability among a set of sequences which the selected alarm is part of.

4. The method as claimed in claim 3, comprising displaying at least a second sequence in the set of sequences which the selected alarm is part of, and its associated probability.

5. The method as claimed in claim 1, wherein the determining comprises analyzing data of a history log of past alarms using a data mining algorithm for determining the at least one sequence of alarms.

6. The method as claimed in claim 1, comprising:
   receiving, in the process control system, a user input defining a control action for preventing the second alarm from being issued, and
   effectuating, in response to the user input, the control action.

7. The method as claimed in claim 6, wherein the user input is received within an estimated time period available after receiving the first alarm and before the second alarm is issued.

8. The method as claimed in claim 1, comprising receiving a user input requesting a popup window comprising detailed information on the first alarm, and providing, in response, the popup window.

9. A computer program for a process control system for monitoring and controlling an industrial process, the computer program further comprising computer program code, which, when executed on at least one processor on the process control system causes the process control system to perform a method including:
   issuing, in the process control system, a first alarm,
   determining, in the process control system, at least a first sequence of alarms which the first alarm is part of,
   displaying, on a display means, at least a second alarm expected to follow the first alarm at a future point in time, the second alarm being part of the at least first sequence of alarms,
   displaying, on the display means, at least one of an estimated point in time for the occurrence of the at least second alarm, and an estimated time available until the second alarm is triggered,
   obtaining for each of a plurality of sequences of alarms which the first alarm is part of, a respective associated probability, and
   displaying, on the display means, each sequence of alarms having a probability fulfilling a threshold criterion and its associated probability.

10. A computer program product comprising the computer program as claimed in claim 9 and a computer readable means on which the computer program is stored.

11. A process control system for monitoring and controlling an industrial process, the process control system being configured to:
   issue a first alarm,
   determine at least a first sequence of alarms which the first alarm is part of,
   display, on a display means, at least a second alarm expected to follow the first alarm at a future point in time, the second alarm being part of the at least first sequence of alarms,
   display, on the display means at least on of an estimated point in time for the occurrence of the at least second alarm and an estimated time available until the second alarm is triggered,
   obtain for each of a plurality of sequences of alarms which the first alarm is part of, a respective associated probability, and display, on the display means, each sequence of alarms having a probability fulfilling a threshold criterion and its associated probability.

12. The process control system as claimed in claim 11, configured to display, on the display means, a plurality of sequences of alarms which the first alarm is part of.

13. The process control system as claimed in claim 11, configured to:
receive a user input selecting one of the alarms, and
display, in response to the user input, a sequence of alarms which a selected alarm is part of, wherein the sequence has the highest probability among a set of sequences which the selected alarm is part of.

14. The process control system as claimed in claim 13, configured to display at least a second sequence in the set of sequences which the selected alarm is part of, and its associated probability.

15. The process control system as claimed in claim 11, configured to determine the at least first sequence of alarms which the first alarm is part of by analyzing data of a history log of past alarms using a data mining algorithm.

16. The process control system as claimed in claim 11, configured to:
receive, in the process control system, a user input defining a control action for preventing the second alarm from being issued, and
effectuate, in response to the user input, the control action.

17. The process control system as claimed in claim 16, wherein the user input is received within an estimated time period available after receiving the first alarm and before the second alarm is issued.

18. The process control system as claimed in claim 11, configured to receive a user input requesting a popup window comprising detailed information on the first alarm, and provide, in response, the popup window.

* * * * *